3,753,947
METHOD OF CURING POLYEPOXIDE COMPOSITIONS USING BF₃·2-ETHYL-2-OXAZOLINE AS A NORMALLY LIQUID CURING AGENT

Robert J. Thomas, Midland, Mich., assignor to
The Dow Chemical Company, Midland, Mich.
No Drawing. Continuation-in-part of application Ser. No. 137,619, Apr. 26, 1971. This application Feb. 28, 1972, Ser. No. 230,095

Int. Cl. C08g 30/16

U.S. Cl. 260—47 EN                                        9 Claims

ABSTRACT OF THE DISCLOSURE

This invention relates to an improved process for curing polyepoxide compositions by utilization of $BF_3$·2-ethyl-2-oxazoline as a normally liquid curing agent which is capable of forming substantially homogeneous solutions of said polyepoxide compositions at low temperatures and wherein such solutions are rapidly curable to high strength materials.

---

This application is a continuation-in-part of copending application Ser. No. 137,619, filed Apr. 26, 1971, now abandoned.

BACKGROUND OF THE INVENTION

The curing of polyepoxide compositions using $BF_3$ complex materials is known, e.g. as disclosed in the Handbook of Epoxy Resins, Chapter 11, page 11 et seq. $BF_3$ complex materials with 2-alkyl-2-oxazolines are also known, e.g. as disclosed by Tomalia and Sheetz, in 4 Journal of Polymer Science, Part A–1, 2253 et seq. (1966). Such prior known $BF_3$ complex materials are solids at normal room temperatures and tend to combine with water upon exposure to the atmosphere thus creating handling difficulties.

It has now been discovered which discovery forms the present invention, that $BF_3$·2-ethyl-2-oxazoline is, unexpectedly, a liquid at normal room temperatures, e.g. a temperature of about 25° C., and is capable of forming homogeneous solutions at such temperature with polyepoxides, and particularly with compositions comprised of a polyepoxide and an oxazine or oxazoline compound such as disclosed in Belgium Pat. 752,047; wherein such solutions can be rapidly cured to high strength materials.

More specifically, the present invention relates to an improved process for curing polyepoxide compositions by utilization of between about 0.25 and 15 mole percent based on epoxy functionality of $BF_3$·2-ethyl-2-oxazoline, as a curing agent.

DESCRIPTION OF THE PREFERRED EMBODIMENTS

The polyepoxide employed may be any of the known curable polyepoxides. Especially useful are those liquid compounds having an average of more than one 1,2-epoxyaliphatic group per molecule and particularly the polyglycidyl ethers of polyhydric phenols such as the diglycidyl ether of bisphenols A and F; their partially halogenated counterparts such as the diglycidyl ether of tetrabrominated bisphenol A; epoxylated derivatives of the novolacs such as their reaction products under basic conditions with epichlorohydrin; and terminally epoxylated polyalkylene glycols such as the doubly epoxylated polyethylene and polypropylene glycols.

Particularly suitable for use as an oxazine or oxazoline in the preparation of latent curable prepolymers of polyepoxides is a monooxazine or monooxazoline compound that is unsubstituted 2-oxazoline or unsubstituted 5,6-dihydro-4H-1,3-oxazine, or either of the foregoing with, as substituent upon the 5- or 6-position, alkyl of from 1 to 10 carbon atoms; or any of the same with, as substituent on the 2-position, alkyl of from 1 to 10 carbon atoms; cycloalkyl of from 3 to 6 carbon atoms; alkoxy of from 1 to 10 carbon atoms; nitro; furyl; fluoro; chloro; bromo; iodo; trifluoromethyl; chloroalkyl or bromoalkyl of $n$ carbon atoms and from 1 to $2n+1$ halogens, $n$ being from 1 to 10; alkoxyalkyl or alkylthioalkyl in either of which any alkyl is of from 1 to 10 carbon atoms; alkylthio of from 1 to 10 carbon atoms; phenyl; or substituted phenyl in which a substituent upon such substituted phenyl is from those above designated there being from 1 to five of such substituents upon said phenyl.

Among the specific oxazine compounds that may be used is 2-methyloxazine.

Among the oxazoline compounds that may be employed are 2-methyloxazoline,
2,4-dimethyloxazoline,
2-ethyloxazoline,
2,5-dimethyloxazoline,
2-propyloxazoline,
2-cyclopropyloxazoline,
2-ethoxyoxazoline,
2-ethoxy-2-oxazoline,
2-(2-methoxy-1-methylethyl)oxazoline,
2-(2-(hexyloxy)ethyl)-oxazoline,
2-(ethylthio)oxazoline,
2-(2-(butylthio)-1-methylethyl)oxazoline,
2-(1-methyl-2-octylthio)ethyl)oxazoline,
2-(1-methyl-2-(dodecylthio)ethyl)oxazoline,
2-(dichloromethyl)oxazoline,
2-(trichloromethyl)oxazoline,
2-(1,1-dichloroethyl)- and 2-(1,1-dichloropropyl) oxazoline,
2-(1,1,3-trichloropropyl)oxazoline,
2-(2-furyl)oxazoline,
2-phenyl-oxazoline,
2-(m-tolyl)oxazoline,
2-(p-tolyl)oxazoline,
5-methyl-2-phenyloxazoline,
2-(p-methoxyphenyl)oxazoline,
2-(p-chloro-phenyl)oxazoline and its o and m isomers,
2-p-fluorophenyloxazoline,
2-(m-bromophenyl)oxazoline,
2-(p-bromophenyl)oxazoline,
the m, p, and o-2-α,α,α-trifluorotolyl)oxazolines,
2-(p-nitrophenyl)oxazoline and its m and o isomers,
5,5-dimethyl-2-(3,4-xylyl)oxazoline,
2-(3,4-dimethoxyphenyl)oxazoline,
5,5-dimethyl-2-(3,4,5-trimethoxyphenyl)oxazoline,
4,4-dimethyl-2-(3,4,5-trimethoxyphenyl)oxazoline,
2-(p-methoxyphenyl)-5-phenyloxazoline, and
2((3,4-dichlorophenoxy)methyl)oxazoline.

In general, a monooxazine or monooxazoline, when used as a curing agent, is employed in an amount of from 1 to 49 equivalent percent of monooxazine or monooxazoline based on epoxide functionality.

Various methods for preparing monooxazine and monooxazoline compounds are known. One convenient method involves reacting a nitrile with trimethylene chlorohydrin or ethylene chlorohydrin in presence of hydrogen chloride and then cyclizing the intermediate thus formed with a base such as triethylamine, trimethylamine, or an alkali metal hydroxide. The cyclizing reaction is generally exothermic and is preferably carried out at a temperature within the range of from 0 to 10° C.

Also suitable for use is a bis-2-oxazine or bis-2-oxazoline compound, such as for example a compound of the formula

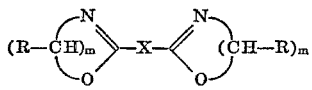

wherein X represents

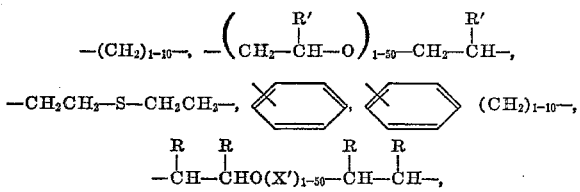

and in the above formulae each R represents hydrogen or alkyl having from 1 to 4 carbon atoms, each R' represents hydrogen or alkyl having from 1 to 3 carbon atoms, $m$ represents 2 or 3, and X' represents ethyleneoxy or propyleneoxy.

In general, the bis-2-oxazine or bis-2-oxazoline is employed in an amount of from 1 to 100 equivalent percent based on epoxy functionality. An amount within the range of from 25 to 100 equivalent percent is preferred, and in some cases at least, the optimum amount is about 100 equivalent percent.

The bis-2-oxazoline and bis-2-oxazine compounds are prepared by any of a group of synthetic routes all of which pass, advantageously, through a cyano group; in the sense that, at each molecular site where an oxazine or oxazoline heterocycle is desired, there is provided as a precursor site, a cyano. From such site it is, in general, convenient and easy to go on to the desired heterocycle. The only condition believed to be limiting is that, with respect to the reactions that go on from the cyano to the heterocycle, preferably the cyano be the most reactive or only significantly reactive site; or, if any other site on the starting cyano compound be more reactive than cyano, then known alternative procedures must be considered. Such procedures are described in U.S. Pat. 3,563,920 issued Feb. 16, 1971.

Initial curing of the polyepoxide and the oxazine of oxazoline is normally effected by heating, characteristically at a temperature above 5° C. and preferably about 120° C. over a period of from about 20 to 30 minutes.

The so-formed linear prepolymers can be maintained as low viscosity liquids by merely warming them at 35–80° C. They can be kept under these conditions for several days to a week without serious viscosity increases, thus allowing use in "prepreg" applications. Thermal cures (150° C.) can produce gelation in about ½ hour and cross-linked resins can be effected by heating for 1–8 hours in the absence of any additives. For some applications, such as filament winding, these cure rates are considered to be too long.

It has also been discovered, which discovery forms a part of the present invention, that homogeneous solutions of such polyepoxides and oxazines or oxazolines can be prepared at low temperatures, e.g. temperatures as low as 25° C., and that the cure rates of such solutions can be significantly increased by admixing therewith small but effective amounts, i.e., generally between about 0.25 to 15 mole percent based on epoxy functionality, of a BF$_3$ complex of 2-ethyl-2-oxazoline.

The following examples are illustrative of the invention:

EXAMPLE 1

(A) Preparation of BF$_3$·2-ethyl-2-oxazoline

A slight molar excess of BF$_3$ is passed slowly over the surface of 2-ethyl-2-oxazoline which has been previously dried by distillation from either sodium wire or lithium dispersion and cooled to −20° C. A white cloud forms over the surface of the 2-ethyl-2-oxazoline as the BF$_3$ flow begins and the flow is continued until such cloud has disappeared. At this point all of the 2-ethyl-2-oxazoline has been complexed with BF$_3$. The resulting product is a liquid which is warmed to room temperature to remove excess BF$_3$.

(B) Reaction of polyepoxide plus 2-methyl-2-oxazoline and BF$_3$·2-ethyl-2-oxazoline To 75 g. (0.40 mole) of a diglycidyl ether of bisphenol A having an epoxy equivalent weight of 186–192 and 9 g. (0.11 mole) of 2-methyl-2-oxazoline was added 8.6 g. (0.05 mole) of BF$_3$·2-ethyl-2-oxazoline while maintaining the mixture at a temperature of about 25° C. whereby a homogeneous solution was unexpectedly obtained. Individual test bars were prepared by pouring a portion of such solution into individual molds and curing the same at elevated temperatures. Such test bars when heated at 150° C. for a period of 90 minutes exhibited a tensile strength of 10,000 and a maximum tensile strength of 13,000 when heated at 150° C. for a period of 210 minutes.

By way of comparison, a composition as described herein to which no polymerization accelerator was added required 9 hours of heating at 150° C. to produce a cured product having a maximum tensile strength of about 10,000.

EXAMPLE 2

Reaction of polyepoxide plus 2,2-thiodiethylene-bis-2-oxazoline plus BF$_3$·2-ethyl-2-oxazoline To 15.6 g. (0.082 mole) of the polyepoxide of Example 1 and 9.4 g. (0.041 mole) of 2,2′-thiodiethylene-bis-2-oxazoline was added 0.14 g. (0.0006 mole) of BF$_3$·2-ethyl-2-oxazoline while maintaining the mixture at a temperature of about 25° C. with resultant formation of a homogeneous solution. Test bars prepared as described in Example 1 cured to a maximum tensile strength of about 13,000 over a 7 hour period while aintained at a temperature of 120° C.

By way of comparison, a composition as described herein to which no polymerization accelerator was added achieved a maximum tensile strength of about 10,000 when heated at a temperature of 150° C.

EXAMPLE 3

Reaction of polyepoxide plus 2,2′-tetramethylene-bis-2-oxazoline plus BF$_3$·2-ethyl-2-oxazoline To 16.3 g. (0.086 mole) of the polyepoxide of Example 1 and 8.7 g. (0.044 mole) of 2,2′-tetramethylene-bis-2-oxazoline was added 0.14 g. (0.0008 mole) of BF$_3$·2-ethyl-2-oxazoline, prepared as described in Example 1, while maintaining the mixture at a temperature of about 25° C. whereby a homogeneous solution was obtained. Test bars prepared as described in Example 1 cured to a maximum tensile strength of about 13,000 over a 3 hour period while maintained at a temperature of 150° C.

By way of comparison, a composition as described herein to which no polymerization accelerator was added required 6 hours to achieve a maximum tensile strength of 7800 p.s.i.

By way of further comparison, a composition as described herein but containing 0.047 g. (0.0004 mole) of BF$_3$·ethyl amine as the polymerization accelerator did not form a homogeneous solution until the mixture was warmed to 60° C. which material cured to a maximum of 10,000 p.s.i. when heated at 150° C. over a 3 hour period,

EXAMPLE 4

Reaction of polyepoxide plus BF₃·2-ethyl-2-oxazoline

To 100 g. of an epoxy novolac resin having an epoxy equivalent weight of 176–181 and a viscosity at 25° C. of between about 35,000 to 70,000 cps., was added 3 g. of BF₃·2-ethyl-2-oxazoline. The resulting mixture was homogeneous at a temperature of about 25° C. and when combined with 150 g. of silica flour followed by the addition of 150 g. of silica sand and 1 g. of black iron oxide and cured for 4 hours at 100° C. followed by 15 hours at 150° C.; produced a tough, chemical resistant material having excellent utility as a laboratory bench top.

By way of comparison, a composition as described herein but containing BF₃·mono ethyl amine as the curing agent, was characterized by having significantly higher viscosities with attendant less desirable flow properties, and could not accommodate as high a level of fillers as is obtainable using the compositions prepared by the process of the present invention.

What is claimed is:

1. In the process of curing liquid polyepoxide compositions said polyepoxide having an average of more than one 1,2-epoxyaliphatic group per molecule with a BF₃ complex curing agent the improvement consisting of utilizing BF₃·2-ethyl-2-oxazoline as such curing agent.

2. The process of claim 1 wherein said BF₃·2-ethyl-2-oxazoline is used in amounts of from about 0.25 to 15 mole percent based on epoxy functionality.

3. The process of claim 2 wherein said polyepoxide compositions contain an oxazine or oxazoline compound.

4. The process of claim 3 wherein said oxazine or oxazoline is a monooxazine or monooxazoline compound that is unsubstituted 2-oxazoline or unsubstituted 5,6-dihydro-4H-1,3-oxazine, or either of the foregoing with, as substituent upon the 5- or 6-position, alkyl of from 1 to 10 carbon atoms; or any of the same with, as substituent on the 2-position, alkyl of from 1 to 10 carbon atoms; cycloalkyl of from 3 to 6 carbon atoms; alkoxy of from 1 to 10 carbon atoms; nitro; furyl; fluoro; chloro; bromo; iodo trifluoromethyl chloroalkyl or bromoalkyl of n carbon atoms and from 1 to 2n+1 halogens, n being from 1 to 10; alkoxyalkyl or alkylthioalkyl in either of which any alkyl is of from 1 to 10 carbon atoms; alkylthio of from 1 to 10 carbon atoms; phenyl; or substituted phenyl in which a substituent upon such substituted phenyl is from those above designated there being from 1 to five of such substituents upon said phenyl.

5. The process of claim 4 wherein said monooxazine or monooxazoline is employed in an amount of from about 1 to 49 equivalent percent based on epoxy functionality.

6. The process of claim 3 wherein said oxazine or oxazoline is a bis-2-oxazine or bis-2-oxazoline compound of the formula

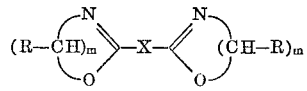

wherein X represents

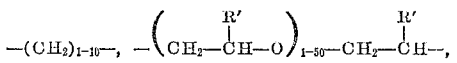

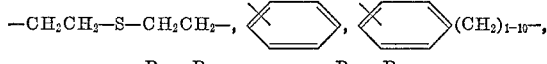

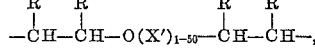

and in the above formulae, each R represents hydrogen or alkyl having from 1 to 4 carbon atoms, each R' represents hydrogen or alkyl having from 1 to 3 carbon atoms, m represents 2 or 3, and X' represents ethyleneoxy or propyleneoxy.

7. The process of claim 6 wherein said bis-2-oxazine or bis-2-oxazoline compound is employed in an amount of from about 25 to 100 equivalent percent based on epoxy functionality.

8. A curable composition which is substantially a homogeneous solution at a temperature of about 25° C. comprising (1) a polyepoxide having an average of more than one 1,2-epoxyaliphatic group per molecule and (2) curing amounts of BF₃·2-ethyl-2-oxazoline.

9. The composition of claim 8 containing in addition thereto and in combination therewith an oxazine or oxazoline compound.

References Cited

UNITED STATES PATENTS

| | | | |
|---|---|---|---|
| 2,824,083 | 2/1958 | Parry et al. | 260—47 |
| 3,640,957 | 2/1972 | Tomalia et al. | 260—47 |
| 3,563,920 | 2/1971 | Tomalia et al. | 260—2 |

OTHER REFERENCES

Journal of Polymer Science, vol. 4, part A1, 1966, pp. 2253–2265.

WILLIAM H. SHORT, Primary Examiner

T. E. PERTILLA, Assistant Examiner

U.S. Cl. X.R.

260—2 N, 37 EP, 59